(12) United States Patent
Kramer

(10) Patent No.: US 7,768,440 B2
(45) Date of Patent: *Aug. 3, 2010

(54) ADVERTISING APPARATUS

(76) Inventor: Kenneth J. Kramer, 324 S. Grant St., Portland, MI (US) 48875

( * ) Notice: Subject to any disclaimer, the term of this patent is extended or adjusted under 35 U.S.C. 154(b) by 0 days.

This patent is subject to a terminal disclaimer.

(21) Appl. No.: 12/313,943

(22) Filed: Nov. 26, 2008

(65) Prior Publication Data

US 2009/0213277 A1   Aug. 27, 2009

(51) Int. Cl.
*G08C 17/00* (2006.01)
(52) U.S. Cl. .................... 341/176; 348/588; 40/585
(58) Field of Classification Search ............. 341/176; 725/40, 43, 78; 348/588
See application file for complete search history.

(56) References Cited

U.S. PATENT DOCUMENTS

| 4,802,022 | A | 1/1989 | Harada |
| 4,850,040 | A | 7/1989 | Teich et al. |
| 5,535,976 | A | 7/1996 | Gruneisen, III |
| 5,883,680 | A | 3/1999 | Nykerk |
| 6,130,726 | A | 10/2000 | Darbee et al. |
| D433,394 | S | 11/2000 | Suzuki |
| 6,204,796 | B1 | 3/2001 | Chan et al. |
| 7,471,232 | B2 | 12/2008 | Kramer |

*Primary Examiner*—Albert K Wong
*Assistant Examiner*—Hung Q Dang
(74) *Attorney, Agent, or Firm*—John G. Chupa

(57) ABSTRACT

An advertising apparatus 10 including a generally flat base 12 and a broad face 14 which forms an acute angle 16 with the generally flat base 12. Further, the broad face 14 includes several display portions 20, 22, and 18 which, in one non-limiting embodiment of the invention, are programmable. In one non-limiting embodiment, the apparatus may include a selectively depressible alarm switch 100.

2 Claims, 2 Drawing Sheets

ADVERTISING APPARATUS

FIELD OF THE INVENTION

The present invention generally relates to an advertising apparatus and more particularly, to an apparatus which may be removably placed within a commercial establishment, such as but not limited to a sleeping establishment, and which includes certain information related to the identity of television channels and the identity of other commercial establishments.

BACKGROUND OF THE INVENTION

Many types of apparatuses, such as and without limitation a billboard, are used to provide advertisement for certain products and services. While these advertisement apparatuses do desirably provide advertisement, they suffer from some drawbacks. For example and without limitation, many of these apparatuses only provide the advertisement information and do not provide other information which the consumer may feel is more useful, thereby limiting the effectiveness of the these apparatuses as they are regarded as having only advertising content and are frequently ignored. Further, by way of example and without limitation, the information which is respectively contained within or included upon many of these apparatuses is not easily modified or changed, thereby undesirably increasing the cost associated with providing advertisement, and many of these prior apparatuses are not readily and selectively deployable within a variety of locations. The present invention addresses these drawbacks in a new and novel fashion.

SUMMARY OF THE INVENTION

It is a first non-limiting advantage of the present invention to provide an advertising apparatus which overcomes some or all of the disadvantages associated with prior advertising apparatuses.

It is a second non-limiting advantage of the present invention to provide an advertising apparatus which overcomes some or all of the disadvantages associated with prior advertising apparatuses and which, by way of example and without limitation, provides a plurality of different types of information, thereby desirably increasing the overall usefulness of the advertising apparatus.

It is a third non-limiting advantage of the present invention to provide an advertising apparatus which overcomes some or all of the disadvantages associated with prior advertising apparatuses and which, by way of example and without limitation, provides information which may be easily and programmably changed and modified.

It is a fourth non-limiting advantage of the present invention to provide an advertising apparatus which overcomes some or all of the disadvantages associated with prior advertising apparatuses and which, by way of example and without limitation, may be selectively and removably placed upon a surface.

It is a fifth non-limiting advantage of the present invention to provide an apparatus comprising a flat base having a certain width and a flat face having a width which is substantially similar to the certain width and which forms an acute angle with respect to the flat base, wherein the flat face includes a first portion having certain information regarding a sleeping establishment, a second portion which includes a listing of television channels, and a third portion which includes information concerning an establishment in close proximity to the sleeping establishment.

It is a sixth non-limiting advantage of the present invention to provide an apparatus comprising a flat base portion; a face portion which forms an acute angle with respect to the flat base portion; a television controller which is operatively contained within the face portion; a symbol which is representative of a television channel, said symbol being disposed on a certain portion of the face portion; and a switch which is coupled to the television controller and which is disposed in close proximity to the symbol and wherein the switch being effective, upon a selective depression, to cause the television controller to cause a television to be tuned to the television channel.

It is a seventh non-limiting advantage of the present invention to provide an apparatus comprising a flat base portion; a face portion which forms an acute angle with respect to said flat base portion; a television controller which is operatively contained within said face portion; a symbol which is representative of a television channel, said symbol being disposed on a certain portion of said face portion; and a switch which is coupled to said television controller and which is disposed in close proximity to said symbol and wherein said switch being effective, upon a selective depression, to cause said television controller to cause a television to be tuned to said television channel.

These and other features and advantages of the present invention will become apparent from a reading of the following detailed description of the invention and by reference to the following drawings.

DETAILED DESCRIPTION OF THE PREFERRED EMBODIMENT OF THE INVENTION

Figure 1:
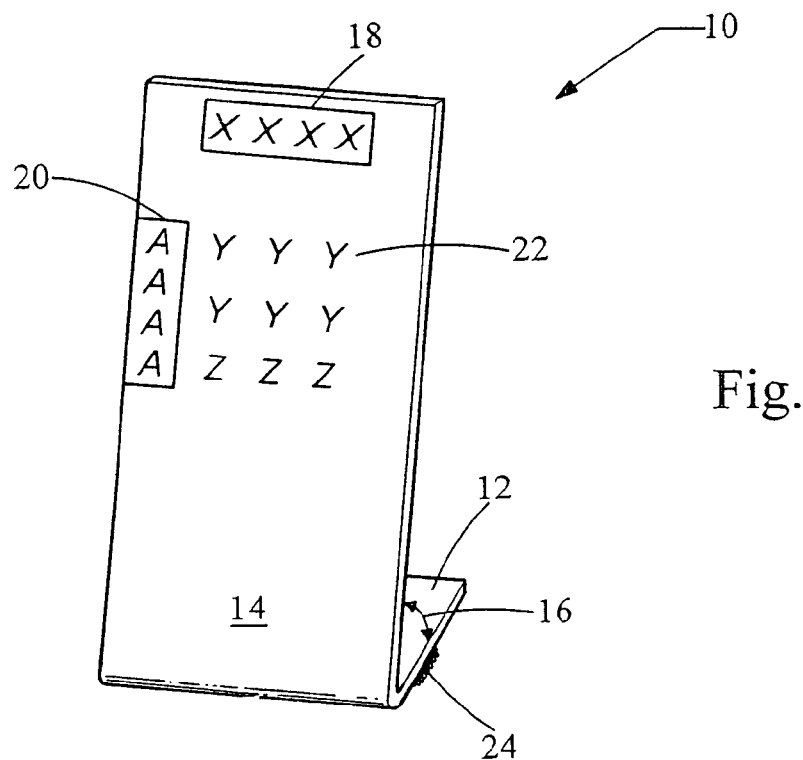
FIG. 1 is a front perspective view of an advertising apparatus which is made in accordance with the teachings of the preferred embodiment of the invention.
Figure 2:
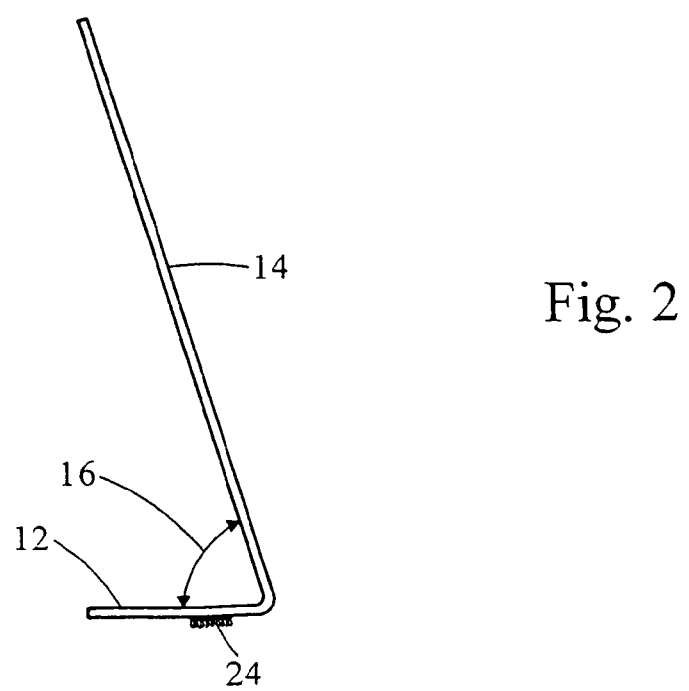
FIG. 2 is a side view of the advertising apparatus which is shown in FIG. 1.

Referring now to FIG. 1, there is shown an advertising apparatus 10 which is made in accordance with the teachings of the preferred embodiment of the invention.

As shown, advertising apparatus 10 comprises a member having a flat base portion 12 and a generally flat and broad face portion 14 which forms an acute angle 16 with the base portion 12. In one non-limiting embodiment of the invention, the apparatus 10 is formed from clear plastic material, although it should be appreciated that other colors and materials may be used to form the apparatus 10. Further, it should be appreciated that the apparatus 10 may be formed into any desired shape or configuration and that in one non-limiting embodiment, the width of the portion 14 ranges from about six inches and the width of the base 12 ranges from about three to about six inches. Other widths may be utilized and, in the most preferred embodiment of the invention, the width of portion 14 is substantially equal to the width of portion 12.

As is further and best shown in FIG. 1, the apparatus 10 includes a first informational portion 18 which comprises or includes information concerning a sleeping establishment, a second informational portion 20 which comprises or includes information concerning an eating establishment, or another type of commercial establishment in close proximity to the sleeping establishment, and a third informational portion 22 comprising or including a listing or identification of television channels which may be selectively received by a television located in close proximity to the advertising apparatus 10. Hence, in one non-limiting embodiment of the invention, the apparatus 10 may be selectively placed near the bed of a hotel room and the pertinent information concerning that hotel (e.g., room rate and/or address and/or telephone number and/or check-out time is listed in the information portion 18). Information concerning a local eating establishment (e.g., a pizzeria) is placed in portion 20. Since the informational portion 22 includes information concerning television channels, (i.e., very useful information) a room occupant is likely to utilize the apparatus 10 and, in so utilizing the apparatus 10, viewing the information portions 18, 20. In one non-limiting embodiment of the invention, the apparatus 10 is secured to a tabletop (not shown) by the use of a Velcro® or other similar type of adhesive member 24 which is placed upon the base member 12. Further, in one non-limiting embodiment of the invention, the information residing within one or more of the informational areas 18, 20, 22 is respectively removable (e.g., is respectively placed upon a label, card, or tape which is removably secured to portion 14.

In one business methodology of the preferred embodiment of the invention, rental income is received from the establishment that is listed in the informational portion 20, thereby allowing the provider of the apparatus 10 to make a profit or subsidize the cost of producing the apparatus 10.

Figure 3:
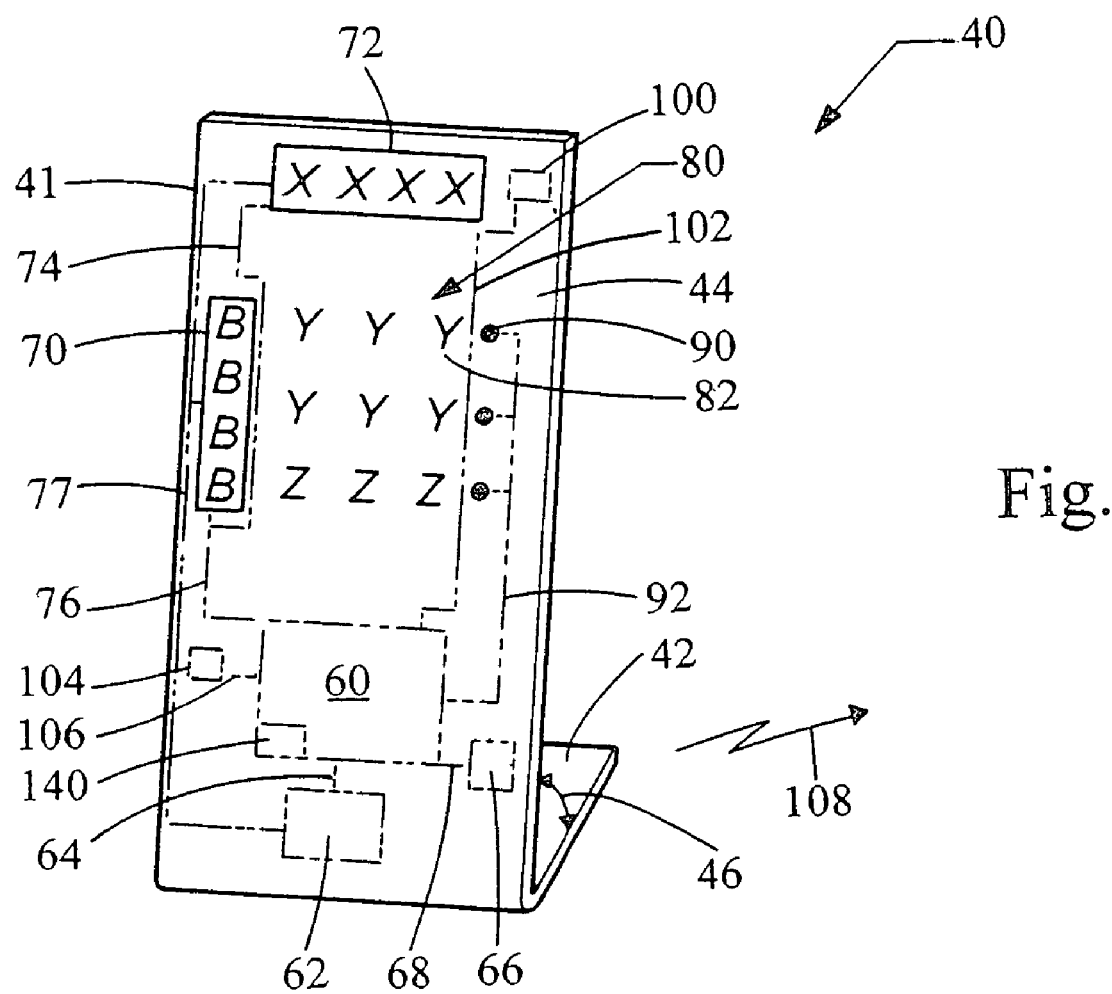
FIG. 3 is a front perspective view of an advertising apparatus which is made in accordance with the teachings of a second embodiment of the invention.

Referring now to FIG. 3, there is shown an advertising apparatus 40 which is made in accordance with the teachings of an alternate embodiment of the invention. Particularly, the advertising apparatus 40 includes a member 41 comprising or including a generally flat base 42 and a generally broad flat portion 44 which forms an acute angle 46 with the generally flat base 42. In one non-limiting embodiment, portions 42, 44 are respectively and substantially similar to portions 12, 14. Within the member 41 is operably contained a controller 60 which is operable under stored program control and a selectively removable battery 62 which is coupled to the controller 60 by the use of bus 64. Further, operably contained within the member 41 is a radio frequency transceiver assembly 66 which is operatively coupled to the controller 60 by the use of bus 68.

The member 41 further includes a first programmable display portion 70 (e.g. a liquid crystal display portion) and a second programmable display portion 72. Both display portions 70, 72 are coupled to the controller 60 by the use of bus 76 and to the battery 62 by the bus 77. The member 41 further includes an informational portion 80 containing a plurality of rows 82 of information. Particularly, each row 82 of information delineates and identifies a unique television channel. Each row of information 82 further includes one selectively depressible switch 90 and all of the selectively depressible switches 90 are operably coupled to the controller 60 by the use of bus 92. Further, the member 41 includes, in yet another alternate embodiment of the invention, another selectively depressible switch 100 which is operably coupled to the controller 60 by the use of bus 102 and an annuciator 104 which is operably coupled to the controller 60 by the use of bus 106.

It should be appreciated that the above described electrical components (e.g., controller 60 and transceiver 66) may be selectively integrated within a single circuit board in a conventional manner. That is, in one non-limiting embodiment of the invention, controller 60, transceiver 66, displays 70, 72, switches 90, 100, annuciator 104, and their respective electrical buses may all be integrated or encapsulated into a single electrical circuit by a conventional molding process.

In operation, a depression of a switch 90 will cause the controller 60 to operate the transceiver 66 in a manner which is effective to cause the transceiver 66 to generate a signal 108 which will cause a television (not shown) to be tuned to the channel which is identified within the row 82 within which that recently depressed switch 90 resides. Further, the controller 60 includes an input/output portion 140 (e.g., a keypad) which is effective to cause the controller 60 to modify or fix the information resident within the information portions 70, 72, thereby allowing the information which respectively resides within portions 70, 72 to be selectively modifiable or programmable. Further, the selective depression of switch 100 causes the controller 60 to source electrical power, from the battery 62 to the annuciator 104, effective to cause the annuciator to generate a loud noise in the form of an alarm.

Hence, it should be appreciated that the advertising apparatus 40 selectively provides desired information and such displayed information may be easily changed or modified as desired, and that the apparatus 10 is further adapted to selectively provide an alarm.

It is to be understood that modifications may be made as desired without departing from the spirit and the scope of the inventions as are delineated in the following claims.

What is claimed is:

1. An remote control apparatus comprising: a flat base having a certain width and a flat face having a width which is substantially the same as said certain width with respect to said flat base, wherein said flat face includes: a first programmable portion having a display for displaying certain information regarding a sleeping establishment; wherein said first portion includes an assembly for controlling a remotely controllable device and wherein said assembly for controlling said remotely controllable device is integrally formed within said first portion;

a second programmable portion having a display for displaying a listing of television channels and; a third programmable portion which displays information concerning a commercial establishment, wherein the first, second, and third programmable portions and a transceiver are coupled to a controller and wherein said controller includes an input/output portion which allows the user to cause said controller to selectively modify the information on said display and to transmit a remote control signal.

2. An remote control apparatus comprising a body: a first programmable portion which is operatively disposed within said body and having a display for displaying certain information regarding a sleeping establishment wherein said first portion includes an assembly for controlling a remotely controllable device; a second programmable portion which is operatively disposed within said body and having a display for displaying a listing of television channels and; a third programmable portion which is operatively disposed within said body and which displays information concerning a commercial establishment in close proximity to said sleeping establishment, wherein the first, second, third programmable portions and a transceiver are coupled to a controller and wherein said controller includes an input/output portion which allows the user to cause said controller to selectively modify the information on said display and to transmit a remote control signal.

* * * * *

UNITED STATES PATENT AND TRADEMARK OFFICE
CERTIFICATE OF CORRECTION

PATENT NO. : 7,768,440 B2  
APPLICATION NO. : 12/313943  
DATED : August 3, 2010  
INVENTOR(S) : Keneth J. Kramer Page 1 of 1

It is certified that error appears in the above-identified patent and that said Letters Patent is hereby corrected as shown below:

On the title page, insert item 63

--RELATED U.S. APPLICATION DATA

This Application is a continuation of 11/804,038 05/16/2007 PAT 7,471,232 which is a continuation of 10/315,678 12/10/2002 ABN.--

Signed and Sealed this
First Day of July, 2014

Michelle K. Lee
*Deputy Director of the United States Patent and Trademark Office*